(12) United States Patent
Töpker et al.

(10) Patent No.: US 6,416,114 B1
(45) Date of Patent: Jul. 9, 2002

(54) SIDE IMPACT BEAM

(75) Inventors: Dieter Töpker; Achim Kröning, both of Paderborn (DE)

(73) Assignee: Benteler AG, Paderborn (DE)

( * ) Notice: Subject to any disclaimer, the term of this patent is extended or adjusted under 35 U.S.C. 154(b) by 0 days.

(21) Appl. No.: 09/710,190

(22) Filed: Nov. 10, 2000

(51) Int. Cl.⁷ .................................................. B60J 1/08
(52) U.S. Cl. ..................................... 296/146.6; 296/188
(58) Field of Search .............................. 296/146.6, 188; 52/798.1

(56) References Cited

U.S. PATENT DOCUMENTS

| | | | | |
|---|---|---|---|---|
| 667,384 A | * | 2/1901 | Brandt .................... | 52/798.1 X |
| 3,481,643 A | * | 12/1969 | Campbell ............... | 52/798.1 X |
| 4,684,166 A | * | 8/1987 | Kanodia .................. | 296/188 X |
| 4,796,946 A | * | 1/1989 | Wilson ..................... | 296/146.6 |
| 4,838,606 A | * | 6/1989 | Furubayashi et al. | 296/146.6 X |
| 5,199,240 A | * | 4/1993 | Ewald, Jr. ................ | 52/798.1 |
| 6,096,403 A | * | 8/2000 | Wycech ............... | 296/146.6 X |

FOREIGN PATENT DOCUMENTS

| | | | |
|---|---|---|---|
| DE | 4133144 | 4/1992 | |
| DE | 4307079 | 9/1994 | |
| EP | 0662053 | 7/1995 | |
| JP | 404208633 | * 7/1992 | .................. 296/188 |

* cited by examiner

Primary Examiner—Dennis H. Pedder
(74) Attorney, Agent, or Firm—Friedrich Kueffner

(57) ABSTRACT

A side impact beam for motor vehicles has a profiled section of sheet metal having a length in a longitudinal direction and having a cross-sectional shape over most of the length. The cross-sectional shape has at least one cross-sectional portion comprised of a stay extending in the longitudinal direction, a first leg and a second leg connected to opposite longitudinal sides of the stay, a first flange connected to a free end of the first leg, and a second flange connected to a free end of the second flange. At least one tension element connects the first and second legs.

7 Claims, 2 Drawing Sheets

SIDE IMPACT BEAM

BACKGROUND OF THE INVENTION

1. Field of the Invention

The invention relates to a side impact beam as a reinforcement component of a motor vehicle, in particular, of a motor vehicle door, which over the predominant portion of its length has a section of sheet metal which, in cross-section, has a hat-shape comprised of a stay, two legs, and two flanges.

2. Description of the Related Art

Side impact beams are provided as a protection for vehicle passengers in regard to injuries resulting from side impact. They are used primarily in the form of door reinforcements. Depending on the stability of the basic construction, they should have a high stiffness transverse to the direction of travel.

In side impact beams of known configuration the high stiffness is, in general, achieved by employing tubes of high-strength material. A tubular door impact beam is, for example, known from German patent documents DE 41 33 144 A1 or DE 43 04 079 A1.

In addition to side impact beams comprised of tubes, there are also impact beams which are comprised of profiled sections made of sheet metal (European patent EP 0 662 053 C1). They are mostly manufactured of conventional drawn sheet metal and have in cross-section a hat-shaped or double hat-shaped configuration. The hat-shaped profiled sections have the advantage that they are comprised of only a single part and are usually of a lighter construction in comparison to tube configurations. However, they have the disadvantage of being open at one side which causes the bending resistance to suffer. Therefore, there have been attempts to close such profiled sections. The advantages of a pipe are then transferred onto such hat-shaped profiled sections. It is known in this context to close the profiled section over its entire length or only partially across a certain area. However, this again results in increased manufacturing expenditure and increased weight.

SUMMARY OF THE INVENTION

It is an object of the present invention to produce a side impact beam with high bending resistance in a more economical way.

In accordance with the present invention, this is achieved in that the profiled section is reinforced by at least one tension element connecting the legs.

The gist of the invention is thus the measure of reinforcing the hat-shaped profile section, which is open at one side, by at least one tension element connecting the legs. Advantageously, the tension element penetrates the legs; however, this is not a requirement.

This measure substitutes the partial closing of the profiled section which has been used in the past. The invention provides a side impact beam which, with regard to manufacturing technology, is advantageous and provides a sufficiently high bending resistance. Depending on the type of vehicle and the required bending resistance, the number of tension elements can be varied accordingly. A change of the basic component geometry is not required. The minimal weight increase resulting from the presence of the tension elements is not detrimental. In comparison to closed profiled sections, the side impact beam according to the invention is expected to provide cost advantages.

An advantageous development of the basic inventive principal suggests that the at least one tension element is arranged in the central longitudinal area of the profiled sections. This can provide an approximately linear drop of the section modulus from the center toward the lateral fastening locations. Accordingly, when a central loading of a side impact beam occurs, a substantially identical bending stress along its entire length will result.

Even when principally different configurations of the tension element are conceivable, in practice it is favorable to embody the tension element either as a rod or a cable.

Such rod-shaped or cable-shaped tension elements are guided through holes produced during the manufacture of the side impact beam, are then tensioned, and secured. Expediently, the holes are produced in the sheet metal blank before its shaping. Especially advantageous with regard to practical use is a positive-locking securing of the tension elements similar to a catch or snap connection. This can be realized, for example, in that the side impact beam or its legs are manufactured with tension and the tension elements are then introduced into correspondingly designed securing openings where they are secured automatically after tension release and spring-back of the legs.

When using a cable as a tension element, it can be advantageously arranged in an S-shaped configuration by guiding it through several holes in the profiled section.

In profiled sections comprised of several hat-shaped cross-sectional portions, which are connected to one another to form a monolithic profiled part via their facing flanges, respectively, the tension element preferably penetrates both cross-sectional portions. This realizes a side impact beam which is optimized with regard to its purpose and which, while maintaining the otherwise employed dimensions of an open profiled section, has a greatly increased bending resistance.

DESCRIPTION OF THE PREFERRED EMBODIMENTS

Figure 1:
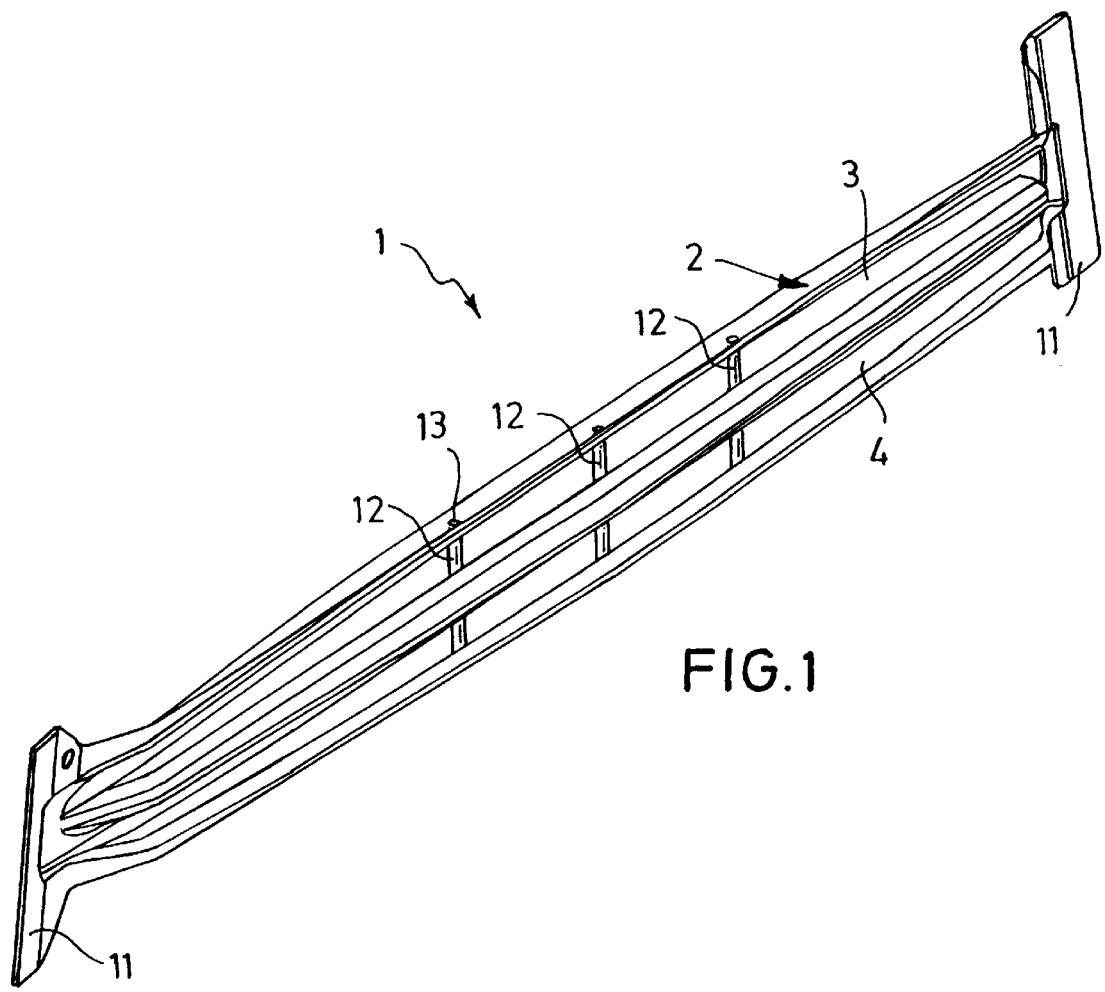
FIG. 1 is a perspective illustration of a side impact beam according to the invention.

FIG. 1 shows a side impact beam 1 which is to be used as a reinforcement component of a motor vehicle door. It is also referred to as a door impact beam.

The side impact beam 1 is comprised of sheet metal. The illustrated embodiment has a so-called double-hat profiled section 2 in which two hat-shaped cross-sectional portions 3, 4, each comprised of a stay 5 or 6, two lateral legs 7, 8, and two flanges 9, 10, are connected to one another to form a monolithic part via two flanges (9, 10) facing one another. This is illustrated in particular in FIG. 2.

For attaching the side impact beam 1 to a door frame, the side impact beam 1 is provided at its ends with widened connecting flanges, respectively. The ends of the profiled section have a transition into these flanges.

In order to provide the side impact beam 1 with an optimal deformation behavior with a sufficiently high bending resistance while using an amount of material as minimal as possible, the portions 3, 4 of the profiled section 2 are reinforced by at least one tension element 12 connecting the legs 7, 8. In the illustrated embodiment, three tension elements 12 are arranged in the central longitudinal area of the portions 3, 4 of the profiled section 2. Basically, the number and the configuration of the tension elements can be adjusted to the respective requirements of a certain motor vehicle type.

Figure 2:
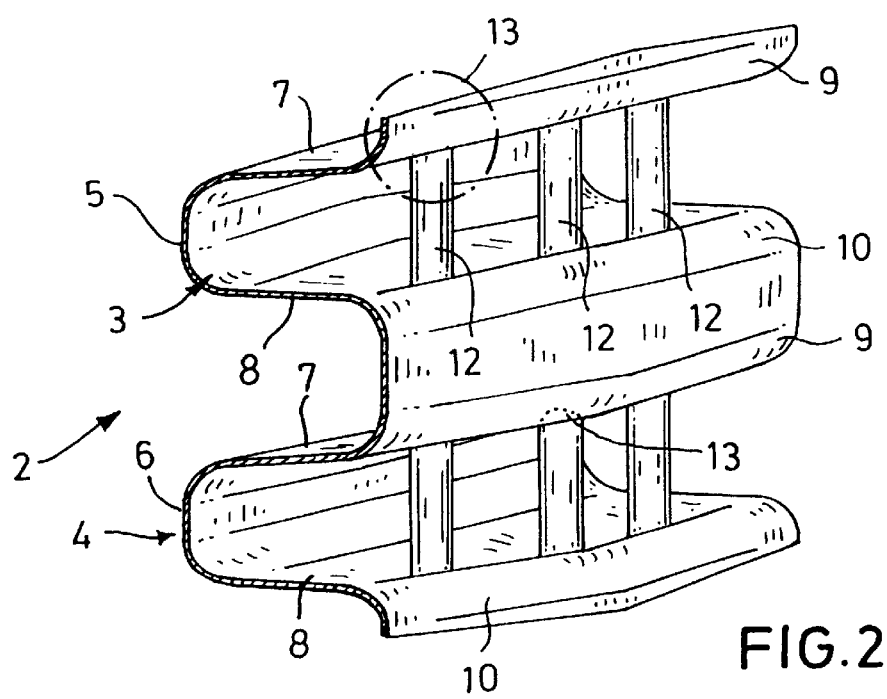
FIG. 2 is a detail view of a portion of the side impact beam according to the invention.

FIG. 2 shows an enlarged detail of the side impact beam. It is clearly shown that the two cross-sectional portion 3, 4 of the double-hat profiled section 2 are penetrated by the tension elements 12. The required hole arrangement 13 of the portions 3, 4 is only indicated schematically (see encircled portion).

Figure 3:
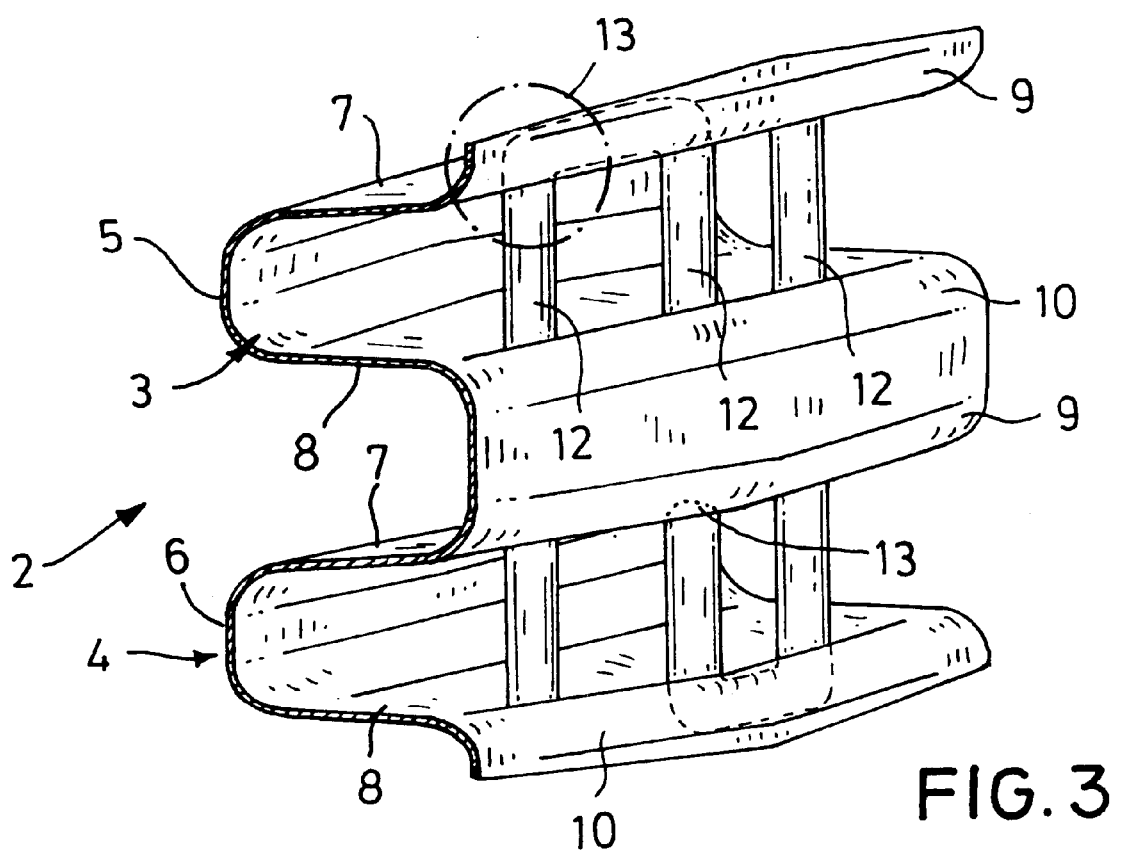
FIG. 3 is a detail view of a portion of another embodiment of the side impact beam according to the invention.

The tension elements 12 increase the bending resistance of the side impact beam 1 significantly. They can be provided as solid or hollow rods. Interesting with regard to practical applications is also the use of a cable as the tension element 12. As shown in FIG. 3, it can be arranged in an S-shaped configuration by guiding it through the cross-sectional portions 3, 4.

The hole arrangement or holes 13 required for guiding the tension elements 12 therethrough is produced in the sheet metal blank of the profiled section. This blank is then subsequently shaped to form the side impact beam 1. Subsequently, the tension elements 12 are mounted. For securing the tension elements 12 on the cross-sectional portions 3, 4, they can be provided with a wider portion at one end which, when guiding the tension elements 12 through the hole arrangement 13 of the profiled section, provides an abutment on the profiled section. The second end of the tension element 12 is then secured by a substantially identical connecting process, which in practice should be as simple as possible, for example, by a rivet-like shaping or upsetting with widening of the second end. Possible is also a catch or snap connection of the tension elements 12 on the legs 7 or 8.

While specific embodiments of the invention have been shown and described in detail to illustrate the inventive principles, it will be understood that the invention may be embodied otherwise without departing from such principles.

What is claimed is:

1. A side impact beam for motor vehicles, the side impact beam comprising:

a profiled section of sheet metal having a length in a longitudinal direction and having a cross-sectional shape over most of the length, wherein the cross-sectional shape comprises at least one cross-sectional portion comprised of a stay extending in the longitudinal direction, a first leg and a second leg connected to opposite longitudinal sides of the stay, a first flange connected to a free end of the first leg, and a second flange connected to a free end of the second flange;

and at least one tension element connecting the first and second legs, wherein the at least one tension element is a rod.

2. The side impact beam according to claim 1, wherein the at least one tension element is arranged in a central longitudinal area of the profiled section viewed in the longitudinal direction.

3. The side impact according to claim 1, wherein at least two of the cross-sectional portions adjoin one another, wherein the first flange of one of the cross-sectional portions is connected to the second flange of another of the cross-sectional portions to form a monolithic profiled part and wherein the at least one tension element penetrates the at least two cross-sectional portions.

4. A side impact beam for motor vehicles, the side impact beam comprising:

a profiled section of sheet metal having a length in a longitudinal direction and having a cross-sectional shape over most of the length, wherein the cross-sectional shape comprises at least one cross-sectional portion comprised of a stay extending in the longitudinal direction, a first leg and a second leg connected to opposite longitudinal sides of the stay, a first flange connected to a free end of the first leg, and a second flange connected to a free end of the second flange;

and at least one tension element connecting the first and second legs, wherein the at least one tension element is a cable.

5. The side impact beam according to claim 4, wherein the cable is arranged in an S-shape.

6. The side impact beam according to claim 4, wherein the at least one tension element is arranged-in a central longitudinal area of the profiled section viewed in the longitudinal direction.

7. The side impact according to claim 4, wherein at least two of the cross-sectional portions adjoin one another, wherein the first flange of one of the cross-sectional portions is connected to the second flange of another of the cross-sectional portions to form a monolithic profiled part and wherein the at least one tension element penetrates the at least two cross-sectional portions.

\* \* \* \* \*